Patented Sept. 6, 1949

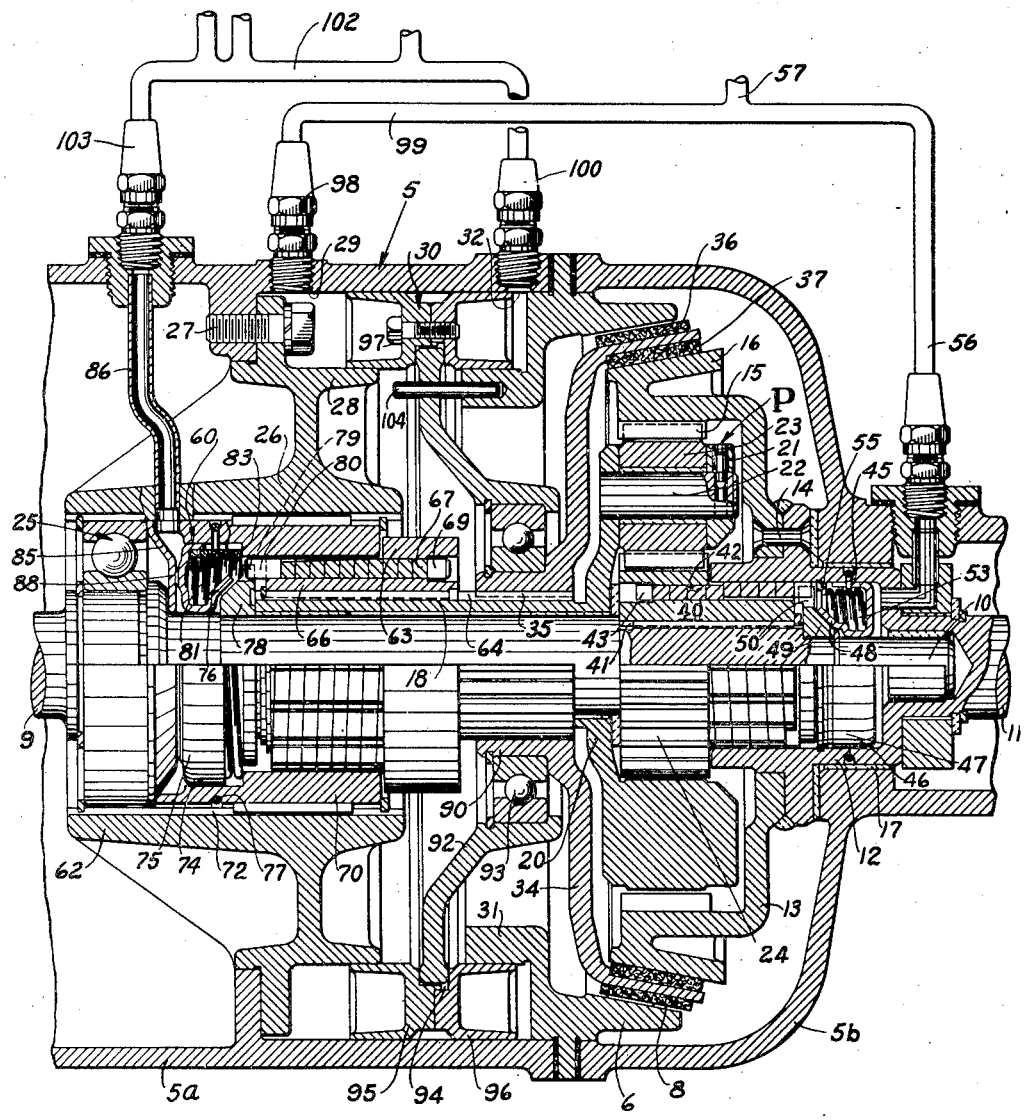

2,481,212

UNITED STATES PATENT OFFICE 2,481,212

TRANSMISSION

Harry R. Greenlee, Indianapolis, Ind., assignor to The Studebaker Corporation, South Bend, Ind., a corporation of Delaware Application July 8, 1946, Serial No. 681,938

21 Claims. (Cl. 74—792)

My present invention relates to an improvement in transmissions, and more particularly to transmissions providing for forward and reverse drive between drive and driven shafts thereof.

I have selected for purposes of disclosing my present invention a transmission of the planetary gear type which, as is known, comprises three elements, namely, a sun gear, planet pinion means, and a ring gear, and in the instant embodiment the planetary gear mechanism disclosed is of the single planet pinion type. It is known in such mechanisms to provide a torque transmitting member which is operable to effect clutching one of the elements such as the ring gear to a second element such as the planet carrier, to effect direct drive in the forward direction between the drive and driven shafts, or for braking one of the elements, such as the planet pinion carrier to effect reverse ratio drive between the drive and driven shafts. While the transmission of my present invention is disclosed in connection with a planetary mechanism as last described it will be understood that it is not limited thereto but has application to other forms of gear means for transmissions.

Usually, planetary gear mechanisms of the above type are associated with one or more additional planetary gear mechanisms or other gear means to provide a plurality of driving ratios between the drive and driven shafts and it will be understood that my present invention has use in combination with such other gear means for the purposes noted. The present invention has particular utility to be embodied posterior of other gear means to provide forward and reverse drives to the driven shaft and further to serve as a master clutch at the rear of the transmission. In such an arrangement of the device of my present invention in a transmission it is required to take low gear ratio for the transmission times engine torque and hence must be of high capacity to prevent slipping of the torque transmitting means when actuated to serve as a clutch to provide direct drive therethrough for low forward ratio drive and to prevent slipping of the torque transmitting means when it serves as a brake to hold one of the elements of the planetary gear mechanism against rotation in effecting reverse drive. In present forms of known mechanisms this arrangement cannot be conveniently accomplished since the known forms of torque transmitting means or members would have to be of a prohibitive diameter for most useful application and particularly for automotive vehicle use in order to provide sufficient clutching and braking area.

It is an object of my invention to provide a transmission of a character suitable for incorporation at the rear of a multi-ratio transmission operable to provide for neutral, forward or reverse drive through the latter, and embodying means providing sufficient capacity to handle the large amount of torque without unduly increasing the height or axial length of the device.

A further object of my invention is to provide a transmission comprising a conventional form of torque transmitting means above referred to having associated therewith coil spring clutch means also of known form operable to prevent slippage in the planetary gear mechanism when clutched together to provide forward drive therethrough when the torque load from the drive to the driven shaft is in excess of the capacity of the torque transmitting means.

A further object of my invention is to provide a transmission comprising a conventional form of torque transmitting means above referred to having associated therewith coil spring brake means of known form operable to prevent slippage of the torque transmitting member when braked to provide reverse drive through the planetary gear mechanism when the torque load from the drive to the driven shaft is in excess of the capacity of the torque transmitting means.

A further object is to provide a transmission having first brake and clutch means such as of the friction cone type associated with gear mechanism to provide for forward drive or reverse drive between drive and driven shafts of the transmission having second brake and clutch means associated therewith, such as the known annular coil spring type of such devices, operable to prevent slippage of the first or friction brake and clutch means when the torque load between the drive and driven shafts is in excess of the capacity of the first friction brake and clutch means.

A further object of my invention is to provide a transmission having first or friction clutch means associated with gear mechanism to provide for forward drive through the gear mechanism between drive and driven shafts of the transmission and having second or coil clutch means associated therewith, such as the known annular coil spring type of clutch, operable to prevent slippage of the first friction clutch means when the torque load between the drive and driven shafts is in excess of the capacity of the first or friction clutch means.

A further object is to provide a transmission having first or friction brake means associated with gear mechanism to provide for reverse drive through the gear mechanism between drive and driven shafts of the transmission having second brake means associated therewith, such as the known annular coil spring type of brake, operable to prevent slippage of the first or friction brake when the torque load between the drive and driven shafts is in excess of the capacity of the first or friction brake means.

Another object of my invention is to provide an arrangement of first friction brake and clutch means having second or coil brake and clutch means associated therewith wherein the first or friction brake and clutch means are selectively operable in effecting clutching or braking of gear means providing for forward and reverse drives between drive and driven shafts of a transmission, and wherein the second or coil brake and clutch means are conditioned for actuation upon actuation of the first or friction brake and clutch means so that in event of slippage of the latter by torque load between the drive and driven shafts in excess of the capacity of the first or friction brake and clutch means the second or coil brake and clutch means are caused to be actuated.

I propose to achieve the aforesaid objects by providing a transmission comprising a planetary gear mechanism in which the drive shaft of the transmission has connection with one of the elements of the planetary gear mechanism and the driven shaft of the transmission has connection with another of the elements of the planetary gear mechanism. In such arrangement of parts I propose to provide a torque transmitting member adapted to have splined connection with the third of the elements of the planetary gear mechanism and which is provided with cone friction elements one of which serves as a first clutch for clutching two of the elements of the planetary gear mechanism together for conjoint rotation to effect forward drive through the planetary gear mechanism, and the other of the cone friction members thereof being adapted to have braking engagement with the case of the transmission to hold the member to which the torque transmitting member is splined against rotation and effect reverse drive between the drive and driven shafts. In such an arrangement of parts I provide a second or annular coil spring clutch of known type associated with two of the elements of the planetary gear mechanism and operable when the torque transmitting means is actuated to provide direct drive to be radially expanded to clutch the two elements of the planetary gear mechanism together when the torque load between the drive and driven shaft is in excess of the capacity of the first or friction cone clutch member. Also I propose to provide a second or annular coil spring brake between the member of the planetary gear mechanism to which the torque transmitting member is splined which is operable when the first or brake friction member of the torque transmitting member is engaged with the case to be expanded into braking engagement with the case when the torque load between the drive and driven shafts is in excess of the capacity of the first or friction cone brake member of the torque transmitting member.

Movement of the torque transmitting member to effect selectively clutching of two elements of the planetary gear mechanism for forward drive, or to effect engagement thereof with the case of the transmission to effect reverse drive is adapted to be effected through fluid under pressure and the arrangement is such that the torque transmitting member is first caused to effect the clutching or braking of the planetary gear mechanism through the first brake or clutch means after which the second or annular coil spring clutch or brake is caused to be conditioned for actuation in the event of slippage in the first or friction brake or clutch means.

The above and other objects and advantages of my invention will appear from the detail description.

Now in order to acquaint those skilled in the art with the manner of constructing and utilizing transmissions in accordance with my present invention, I shall describe in connection with the accompanying drawing a preferred embodiment of my invention.

The single figure of the drawing is a vertical sectional view through a transmission constructed in accordance with the principles of my present invention with certain of the parts of the transmission being shown in elevation.

The transmission shown in the drawing comprises a transmission housing 5 formed by a pair of housing sections 5a and 5b between which an outer annular flange of a cone brake member 6 is fixedly secured. The cone brake member 6, as shown, is formed with an internal tapered friction brake surface 8.

A drive shaft 9 extends into the transmission housing 5 and is piloted at its outer reduced end at 10 in the adjacent end of a co-axially extending driven shaft 11. The driven shaft 11 at its inner end has formed integral therewith a tubular portion 12 having a radially extending flange to which a ring gear member or element 13 of the planetary gear mechanism P is riveted as at 14. The ring gear member 13 has an internal ring gear 15 and is formed with a cone clutch portion 16 having an external friction cone surface tapered correspondingly with the taper of the friction brake surface 8 of the brake member 6 and spaced radially inwardly of the latter. The driven shaft 11, as shown, is adapted to be journalled in a bushing 17 carried in the housing section 5b.

The planetary gear mechanism P further comprises a planet pinion means or element of which the planet carrier means is formed by a planet carrier shaft or sleeve 18 having a radially extending flange 20 at its outer end and an end portion 21 with the flange 20 and end plate 21 providing for the support therebetween of a plurality of planet pins one of which is shown at 22. A plurality of single planet pinions 23, only one of which is shown in the drawing, are rotatably mounted one each on one each of planet pins 22. The plurality of planet pinions 23 are adapted to have meshing engagement with the ring gear 15 and the sun gear member 24 which sun gear forms the third element of the planetary gear mechanism P. It will be understood that other forms of gear means may be disposed between the drive and driven shafts of the transmission within the scope of my present invention. The drive shaft 9 is journalled in a ball bearing assembly 25 carried in a support member 26 extending transversely of housing section 5a. The support member 26 is secured in fixed relation with housing section 5a, to form, in part, a transmission case means therewith, as by a plurality of bolts 27 having threading engagement with a radially inwardly extending annular flange of the housing section 5a, and, further has an inwardly spaced axially extending annular flange portion 28 which with the adjacent portion of the housing forms a cylinder 29 in which one end of a piston 30 is disposed. The cone brake member 6 is also formed with an inwardly spaced and axially extending annular flange portion 31 which with the adjacent portion of the housing forms a cylinder 32 for the opposite end of the piston 30. A torque transmitting member 34 is provided with a central hub portion having splined connection as at 35 with external splines on the shaft portion 18 of the planet carrier means. The splined arrangement of the torque transmitting member 34 on the shaft 18 of the planet carrier means permits axial shifting movement of the member 34 relative to the sleeve 18 and to the fixed cone brake member 6 and the clutch portion 16 of the ring gear member 13. The torque transmitting member 34 has a tapered external friction cone clutch element 36 for engagement with the cone brake surface 8 of the fixed cone brake member 6, and an internal friction cone clutch element 37 for engagement with the cone clutch surface of the cone clutch portion 16 of the ring gear member 13. As shown, the cone clutch members 36 and 37 are preferably formed of suitable known friction material.

The sun gear member 24 of planetary gear mechanism P is formed with an outwardly extending hollow sleeve portion 40 which is adapted to have splined engagement with the splines 41 of the drive shaft 9 for rotation therewith. The outer end of sleeve portion 40 extends into the tubular portion 12 on the driven shaft 11 and as shown defines an annular passageway therebetween. An annular coil spring 42 of the type known in the art as an L. G. S. coil spring clutch has a number of its turns disposed within the sun gear 24 and the remainder of its turns are disposed in the annular passageway between the outer end of the sleeve portion 40 and the hub portion 12 of the driven shaft. The end of the spring disposed within the sun gear is suitably fixed thereto as at 43. The hub portion 12 further forms a cylinder 46 in which a piston 47 is disposed. The piston 47 is keyed to the hub portion 12 of driven shaft 11 by means of the split locking ring 45. The inner end of the piston 47 is provided with a tapered annular conical portion 48 adapted to have clutching engagement with an annular spring actuating collar 49 loosely disposed about the reduced end 10 of drive shaft 9 and is formed with a toe portion 50 adapted to engage the other or free end of the coil spring 42 for restraining it against rotation. A coil spring 53 is disposed within the piston 47 seating at one end against the outer wall thereof and at its inner end against a split lock ring member 55 with the spring 53 being arranged to normally bias the piston 47 to the right as viewed in the drawing to disengage the conical clutching surface portion 48 of the piston from the spring actuating collar 49 so that normally the free end of the annular coil spring 42 is disengaged rendering the latter inoperative. Fluid under pressure is adapted to be admitted into the cylinder 46 through the branch 56 of a conduit 57 to cause the piston 47 to move to the left as viewed in the drawing to engage the conical portion 48 of the same with the spring actuating collar 49 to clutch the latter to piston 47 and thereby hold the free end of the coil spring to condition it for actuation in a manner and for a purpose to be described in greater detail hereinafter.

The transmission of my present invention also comprises a second brake means 60 enclosed within the sleeve portion 62 of the member 26 and includes a coil spring carrier member 63 having splined engagement with the splines 64 of the planet arm shaft 18 and which member 63 is provided with an inwardly extending reduced sleeve portion 66. One end of an annular coil spring brake 67 is secured as at 69 to the enlarged outer end portion of the member 63 with the end portion 66 of the member 63 being disposed within a sleeve 70 having splined connection with internal splines 72 formed in the inner surface of the hub portion 62 of the support member 26. The inner cylindrical surface of the outer end portion of the member 70 together with the outer cylindrical surface of the coil spring brake carrier member 66 provide an annular passageway therebetween between which the inner turns of the annular coil spring 67 are disposed. The member 70 at its outer end is formed to provide a cylinder 74 in which a piston 75 is disposed and which piston 75 at its outer end is provided with an annular conical clutching portion 76 adapted to have braking engagement with a correspondingly tapered braking surface of a spring actuating collar 78 freely mounted about the drive shaft 9 and which member 78 is provided with a toe portion 79 adapted to engage the free end 80 of the annular coil spring 67. The piston 75 is keyed to the sleeve member 70 by means of the locking ring member 77. A coil spring 81 seats at one end against the outer end of the coil spring actuating piston 75 and at its inner end against the shoulder 83 in the member 70. The coil spring 81 normally biases the piston 75 to the left as viewed in the drawing so that the annular conical brake portion 76 thereof is out of engagement with the spring actuating collar 78 whereby the free or inner end 80 of the coil spring 67 is normally free to rotate. The cylinder 74 at the inner end of the transmission is closed by an end disc or wall member 85 and fluid under pressure is adapted to be admitted into the cylinder through a conduit 86 adapted to have connection with a source of fluid under pressure as will be referred to in detail hereinafter. It will be observed that the closed inner end of the piston 76 is formed with an annular ridge 88 so that upon initial admission of fluid under pressure into the cylinder the pressure will act against only a portion of the end area of the piston 75 and after the piston 75 has moved inwardly a slight amount the entire area of the closed end of the piston 75 is exposed to the fluid under pressure being admitted through the duct 86 to effect rapid movement of the piston 75 to the right to engage the brake surface thereof with the collar 78 holding the latter against rotation and which through the engagement of the toe portion 79 thereof with the free end 80 of the coil spring 67 conditions the latter for actuation in a manner to be described hereinafter.

The torque transmitting member 34 is shiftable axially of the axis of the drive shaft 9 of the transmission in that its inner sleeve portion 90 has splined connection with the splines at the outer end of the planet arm shaft 18. The torque transmitting member 34 is adapted to be shifted axial of the transmission through a shifter arm 92 having connection with the latter through a ball-bearing assembly 93. The arm 92 at its outer end is disposed in an annular groove 94 formed by the adjacent abutting ends of the cup-shaped members 95 and 96 which together form the piston 30. The cup-shaped members 95 and 96 are of annular form and as shown are secured together adjacent their closed ends by a plurality of bolts 97 one of which is shown in the drawing. The cylinder space 29 as shown has connection through a coupling 98 with a branch 99 of the conduit 57 having the branch 56 extending to the cylinder 47 for the coil spring clutch means 42, and the cylinder space 32 has connection by means of a connector 100 with a conduit 102 which as shown also extends to a connector 103 extending to the conduit 86 leading to the coil spring brake means 60. The arm 92 is adapted to have sliding engagement with a guide pin 104 fixed at one end in the brake member 6 to guide the axial movement of the torque transmitting means and also to prevent rotation of the arm 92. The piston 30 normally is disposed in freely moving relation in the cylinders 29 and 32 and movement thereof is adapted to be effected by the selective admission of the fluid under pressure into one or the other of the cylinders 29 and 32. When the cylinders 29 and 32 are devoid of pressure the torque transmitting member 34 will float freely so that under this condition torque is not adapted to be transmitted from the drive shaft to the driven shaft providing a neutral for the transmission.

The operation of the transmission is as follows:

In the position of the parts shown in the drawing fluid under pressure has been admitted through the branch 99 of the conduit 57 into the cylinder 29 which has urged the shifter arm 92 and the torque transmitting member 34 to the right as viewed in the drawing to engage the friction cone clutch element 37 with the clutch surface of the clutch portion 16 of the ring gear member 13, and in which position the torque transmitting member by virtue of its splined connection with the planet arm shaft 18 of the planet pinion carrier clutches the planet pinion means with the ring gear 13 of the transmission providing direct drive in the forward direction from the drive shaft 9 to driven shaft 11. Also, the cylinder 46 is charged with fluid under pressure so that the piston 47 is in its left hand position in which the spring actuating collar 49 is clutched to the hub portion 12 of the driven shaft 11 with the toe 50 of the actuating collar 49 in engagement with the free end of the coil spring 42. The coil spring 42 as shown in the drawing has been expanded radially to effect clutching engagement of the sun gear 24 with the ring gear 13. Expansion of the coil spring 42 occurs when after engagement of the clutch element 37 of torque transmitting member with the clutch portion 16 of ring gear 13 a torque condition between the drive and driven shafts exists in which the clutch capacity of the friction cone 37 and clutch portion 16 of the ring gear is not sufficient to prevent slippage thereof relative to the ring gear member 13. Upon a limited amount of such slippage it will be observed since the toe of the clutch actuating collar 49 is in engagement with the free end of the coil spring 42 that it will be expanded radially to clutch the sun gear to the ring gear and which energization of the coil spring clutch means is effective to prevent further slippage of the torque transmitting member 34 with respect to the ring gear. Thus under heavy torque load between the drive and driven shafts in excess of the clutch capacity of the cone clutch element 37 with the clutch surface of portion 16 ring gear member 13, the coil spring means 42 operates to maintain the planetary gear mechanism locked-up for direct drive therethrough. It will be observed that in the admission of fluid under pressure into cylinder 29 through conduit 57 that the fluid under pressure will initially effect movement of the piston 30 to the right to cause the friction cone ring 37 to engage the clutch portion 16 of the ring gear 13 prior to conditioning of the annular coil spring clutch 42 for actuation. This sequence of operation is brought about by the fact the pressure being admitted to the conduit 57 first acts against the relatively large area of the cup-shaped portion 95 of the piston 30 to effect movement of the torque transmitting member 34 to the right, as viewed in the drawing, before the pressure is effective to urge the piston 47 to the left to clutch the collar 49 to the driven shaft. The biasing spring 53 associated with the piston 47 together with the extremely small area of the piston 47 as compared with the effective area of the piston 30 provides for this sequence of operation of the clutches. It will be observed that if the capacity of the friction disc 37 and clutch member 16 is sufficient to handle the torque between the drive and driven shafts that the annular coil spring clutch 42 will not be expanded radially since there will be no relative turning movement of the ring gear member 13 with respect to the sun gear member 24 and that under these circumstances the inward movement of the piston 47 is effective only to condition the coil spring clutch 42 for actuation. It will then only be actuated in the event relative movement occurs between the ring gear member 13 and the sun gear member 24 which relative movement will be effected upon slippage of the friction clutch member 37 with respect to the clutch portion 16 of the ring gear member 13. Thus it will be observed that I have provided an arrangement of a pair of first and second clutches for effecting direct drive through a planetary gear mechanism comprising a first or friction clutch means for initially effecting lock-up of the planetary gear mechanism and in the event of slippage in such first clutch means a second clutch such as an L. G. S. coil spring clutch is caused to be expanded to maintain the planetary gear mechanism in locked-up position. With the transmission actuated as last described it will be observed that the friction clutch member 37 will prevent overrunning of the L. G. S. coil spring clutch 42 in the event the driven shaft tends to overrun the drive shaft.

Now assuming that the conduit 57 is devoid of pressure and the conduit 102 is charged with fluid under pressure through one of the feed branches thereof this fluid will be effective to move first the annular piston 30 to the left as viewed in the drawing. Movement of the piston 30 to the left is effective through the shifter arm 92 to shift the torque transmitting member 34 to the left to engage the friction brake element 36 thereof with the brake surface 8 of the brake member 6 to hold the planet carrier means of the planetary gear mechanism P against rotation and thereby effect reverse drive to the driven shaft 11. The piston 75 as previously referred to is provided with the annular ridge 88 so that only a small area of the piston is caused to be initially acted upon by the fluid under pressure admitted through conduit 102, but which after engagement of the friction brake and upon slight movement of piston 75 to the right the entire closed end area thereof is adapted to be acted on to promptly condition the coil spring brake 67 for actuation. After the friction brake element 36 has been engaged with the brake member 6 the fluid under pressure in conduit 86 will be effective to cause shifting movement of the piston 75 to the right as above related to brake the spring actuating collar 78 to the case of the transmission with the toe portion 79 of the collar in engagement with the free end 80 of the coil spring brake 67 to condition the latter for actuation in the event of slippage of the friction brake element 37 of the torque transmitting member 34. It will be understood that the second or coil spring brake 67 will not be caused to be expanded radially unless the torque load between the drive and driven shafts is of sufficient amount to effect slippage of the first or friction brake means associated with the torque transmitting member 34. However if such slippage occurs the relative movement of the planet arm shaft 18 will effect the radial expansion of the coil spring brake 67 to brake the planet arm shaft against rotation thereby maintaining the planetary gear mechanism in a position for effecting reverse drive from the drive shaft 9 to the driven shaft 11. In the event the driven shaft tends to overrun the drive shaft 9 the engagement of the first or friction brake means of the torque transmitting member 34 will prevent such overrunning in the transmission.

While I have shown what I consider to be the preferred embodiment of my invention it will be understood that various modifications and rearrangements may be made therein without departing from the spirit and scope of my invention.

I claim:

1. In a transmission having drive and driven shafts, gear means including gears disposed between said drive and driven shafts, first brake means associated with said gear means operable for braking one of said gears to effect drive through said gear means from said drive shaft to said driven shaft, and second normally disengaged brake means associated with said gear means and said first brake means operable to engaged position for maintaining said drive from said drive shaft to said driven shaft through said gear means by slipping of said first brake means.

2. In a transmission having drive and driven shafts, gear means including gears disposed between said drive and driven shafts, first clutch means associated with said gear means operable for clutching said gears together to effect through the latter a first driving relation between said drive and driven shafts, second normally disengaged clutch means associated with said gear means and said first clutch means operable to engaged position for maintaining said first driving relation between said shafts through said gear means by slipping of said first clutch means, first brake means associated with said gear means operable for braking one of said gears to effect through the latter a second driving relation between said drive and driven shafts, and second normally disengaged brake means associated with said gear means and said first brake means operable to engaged position for maintaining said second driving relation between said shafts through said gear means by slipping of said first brake means.

3. In a transmission having drive and driven shafts, gear means including gears disposed between said drive and driven shafts, first brake means associated with said gear means operable for braking one of said gears to effect drive from said drive shaft to said driven shaft, second normally disengaged brake means associated with said gear means and said first brake means adapted to be conditioned for actuation by operation of said first brake means in providing said drive from said drive shaft to said driven shaft, and said second brake means being operable to engaged position automatically for braking said one gear for maintaining said drive from said drive shaft to said driven shaft through said gear means by slipping of said first brake means.

4. In a transmission having drive and driven shafts, gear means including gears disposed between said drive and driven shafts, first clutch means associated with said gear means operable for clutching said gears together to effect a first driving relation from said drive shaft to said driven shaft, second normally disengaged clutch means associated with said gear means and said first clutch means adapted to be conditioned for actuation by operation of said first clutch means in providing said first driving relation from said drive shaft to said driven shaft, said second clutch means being operatable automatically to engaged position for maintaining said first driving relation from said drive shaft to said driven shaft through said gear means by slipping of said first clutch means, first brake means associated with said gear means operable for braking one of said gears to effect a second driving relation from said drive shaft to said driven shaft, second normally disengaged brake means associated with said gear means and said first brake means adapted to be conditioned for actuation by operation of said first brake means in providing said second driving relation from said drive shaft to said driven shaft, and said second brake means being operable automatically to engaged position for braking said one gear for maintaining said second driving relation between said shafts through said gear means by slipping of said first brake means.

5. A transmission having drive and driven shafts comprising a planetary gear mechanism having three elements, namely, a sun gear, planet pinion means and a ring gear, one of said elements having connection with said drive shaft and another of said elements having connection with said driven shaft, first brake means associated with said planetary gear mechanism for braking one of the elements thereof against rotation and providing drive from said drive shaft to said driven shaft, and second normally disengaged brake means associated with said planetary gear mechanism and said first brake means operable to engaged position for maintaining said drive from said drive shaft to said driven shaft through said planetary gear mechanism by slipping of said first brake means.

6. A transmission having drive and driven shafts comprising a planetary gear mechanism having three elements, namely, a sun gear, planet pinion means and a ring gear, one of said elements having connection with said drive shaft and another of said elements having connection with said driven shaft, friction brake means associated with said planetary gear mechanism for braking one of the elements thereof against rotation and providing drive from said drive shaft to said driven shaft, and normally disengaged coil spring brake means associated with said planetary gear mechanism and said first brake means operable to engaged position for maintaining said drive from said drive shaft to said driven shaft through said planetary gear mechanism by slipping of said friction brake means.

7. A transmission having drive and driven shafts comprising a planetary gear mechanism having three elements, namely, a sun gear, planet pinion means and a ring gear, one of said elements having connection with said drive shaft and another of said elements having connection with said driven shaft, first clutch means associated with said planetary gear mechanism for clutching two of the elements thereof together to provide direct drive from said drive shaft to said driven shaft, second normally disengaged clutch means associated with said planetary gear mechanism and said first clutch means operable to engaged position for maintaining said direct drive from said drive shaft to said driven shaft through said planetary gear mechanism by slipping of said first clutch means, first brake means associated with said planetary gear mechanism operable to hold one of the elements thereof against rotation to effect rotation of said driven shaft in a direction opposite the direction of rotation of said drive shaft, and second normally disengaged brake means associated with said planetary gear mechanism and said first brake means operable to engaged position for maintaining said one of the elements of said planetary gear mechanism against rotation by slipping of said first brake means.

8. A transmission having drive and driven shafts comprising a planetary gear mechanism having three elements, namely, a sun gear, planet pinion means and a ring gear, one of said elements having connection with said drive shaft and another of said elements having connection with said driven shaft, friction clutch means associated with said planetary gear mechanism for clutching two of the elements thereof together to provide direct drive from said drive shaft to said driven shaft, normally disengaged coil spring clutch means associated with said planetary gear mechanism and said friction clutch means operable to engaged position for maintaining said direct drive from said drive shaft to said driven shaft through said planetary gear mechanism by slipping of said friction clutch means, friction brake means associated with said planetary gear mechanism operable to hold one of the elements thereof against rotation to effect rotation of said driven shaft in a direction opposite the direction of rotation of said drive shaft, and normally disengaged coil spring brake means associated with said planetary gear mechanism and said friction brake means operable to engaged position for maintaining said one of the elements of the latter against rotation by slipping of said friction brake means.

9. A transmission having drive and driven shafts comprising a planetary gear mechanism having a sun gear, single planet pinion means, and a ring gear, said sun gear having connection with said drive shaft, said ring gear having connection with said driven shaft, friction clutch means associated with said planetary gear mechanism for clutching said ring gear and said planet pinion means together, and coil spring clutch means for clutching said ring gear and said sun gear together.

10. A transmission having drive and driven shafts comprising transmission case means, planetary gear mechanism in said case means having a sun gear, a planet arm carrying single planet pinion means, and a ring gear, said sun gear having connection with said drive shaft and said ring gear having connection with said driven shaft, friction brake means slidable axially on said planet arm for braking said planet pinion means to said case means, and coil spring brake means between said planet arm and said case means for braking said planet pinion means to said case means.

11. A transmission having drive and driven shafts comprising transmission case means, planetary gear mechanism in said case means having a sun gear, single planet pinion means and a ring gear, said sun gear having connection with said drive shaft and said ring gear having connection with said driven shaft, friction clutch means between said ring gear and said planet pinion means for clutching the same together, coil spring clutch means between said ring gear and said sun gear for clutching the same together, friction brake means for braking said planet pinion means to said case means, and coil spring brake means for braking said planet pinion means to said case means.

12. A transmission having drive and driven shafts comprising a planetary gear mechanism having three elements, namely, a sun gear, planet pinion means and a ring gear, one of said elements having connection with said drive shaft and another of said elements having connection with said driven shaft, first and second clutch means one each being arranged between two elements of said planetary gear mechanism, and first and second brake means each being associated with one of the elements of said planetary gear mechanism.

13. A transmission having drive and driven shafts comprising a planetary gear mechanism having three elements, namely, a sun gear, planet pinion means and a ring gear, one of said elements having connection with said drive shaft, a second of said elements having connection with said driven shaft, a torque transmitting member splined for movement axially of the third of said elements, said torque transmitting member having friction clutch means for selectively clutching said third element and said second element together for conjoint rotation, and friction brake means for selectively braking said third element against rotation, coil spring clutch means between said one element and said second element of said planetary gear mechanism, and coil spring brake means for said third element of said planetary gear mechanism.

14. In a transmission having drive and driven shafts the combination of gear means between said drive and driven shafts, first fluid pressure responsive clutch means associated with said gear means adapted when engaged to effect drive from said drive shaft to said driven shaft, means for admitting fluid under pressure to said first fluid clutch means to engage the latter, normally inoperative second clutch means associated with said gear means and said first clutch means including means for conditioning said second clutch means for actuation by said fluid under pressure for effecting actuation of said first clutch means, and said second clutch means including means adapted when the same is conditioned for actuation to be actuated by slipping of said first clutch means to maintain said drive from said drive shaft to said driven shaft.

15. In a transmission having drive and driven shafts the combination of gear means between said drive and driven shafts, first fluid pressure responsive brake means associated with said gear means adapted when engaged to effect drive from said drive shaft to said driven shaft, means for admitting fluid under pressure to said first brake means to engage the latter, normally inoperative second brake means associated with said gear means and said first brake means including means for conditioning said second brake means for actuation by said fluid under pressure for effecting actuation of said first brake means, and said second brake means including means adapted when the same is conditioned for actuation to be actuated by slipping of said first brake means to maintain said drive from said drive shaft to said driven shaft.

16. In a transmission having drive and driven shafts the combination of gear means between said drive and driven shafts, first fluid pressure responsive clutch means associated with said gear means adapted when engaged to effect a first driving relation from said drive shaft to said driven shaft, means for admitting fluid under pressure to said first clutch means to engage the latter, normally inoperative second clutch means associated with said gear means and said first clutch means including means for conditioning said second clutch means for actuation by said fluid under pressure for effecting actuation of said first clutch means, said second clutch means including means adapted when the same is conditioned for actuation to be actuated by slipping of said first clutch means to maintain said first driving relation from said drive shaft to said driven shaft, first fluid pressure responsive brake means associated with said gear means adapted when engaged to effect a second driving relation from said drive shaft to said driven shaft, means for admitting fluid under pressure to said first brake means to engage the latter, normally inoperative second brake means associated with said gear means and said first brake means including means for conditioning said second brake means for actuation by said fluid under pressure for effecting actuation of said first brake means, and said second brake means including means adapted when the same is conditioned for actuation to be actuated by slipping of said first brake means to maintain said second driving relation from said drive shaft to said driven shaft.

17. In a transmission having drive and driven shafts the combination of, a planetary gear mechanism having three elements, namely, a sun gear, planet pinion means, and a ring gear, with one each of a pair of said elements having connection with said said drive shaft and said driven shaft, first fluid pressure responsive clutch means between two of the elements of said planetary gear mechanism adapted when engaged to clutch said two elements together to effect direct drive from said drive shaft to said driven shaft, means for admitting fluid under pressure to said first clutch means to engage the latter, normally inoperative second clutch means between two of said elements of said planetary gear mechanism and said first clutch means including means for conditioning said second clutch means for actuation by said fluid under pressure for effecting actuation of said first clutch means, and said second clutch means including means adapted when the same is conditioned for actuation to be actuated by slipping of said first clutch means to maintain said direct drive from said drive shaft to said driven shaft.

18. The transmission of claim 17 characterized by said second clutch means being arranged between one of the two elements with which the first clutch means is associated and the third element of the planetary gear mechanism.

19. In a transmission having drive and driven shafts the combination of a planetary gear mechanism having three elements, namely, a sun gear, planet pinion means and a ring gear, with one each of a pair of said elements having connection with said drive shaft and said driven shaft, first fluid pressure responsive brake means associated with one of the elements of said planetary gear mechanism adapted when engaged to brake said one element against rotation to effect drive from said drive shaft to said driven shaft, means for admitting fluid under pressure to said first brake means to engage the latter, normally inoperative second brake means associated with said one element of said planetary gear mechanism and said first brake means including means for conditioning said second brake means for actuation by said fluid under pressure for effecting actuation of said first brake means, and said second brake means including means adapted when the same is conditioned for actuation to be actuated by slipping of said first brake means to maintain said drive from said drive shaft to said driven shaft.

20. In a transmission having drive and driven shafts the combination of a planetary gear mechanism having three elements, namely, a sun gear, single planet pinion means, and a ring gear, first fluid pressure responsive clutch means between two of the elements of said planetary gear mechanism adapted when engaged to clutch said two elements together to effect direct drive from said drive shaft to said driven shaft, means for admitting fluid under pressure to said first clutch means to engage the latter, normally inoperative second clutch means between two of said elements of said planetary gear mechanism and said first clutch means including means for conditioning said second clutch means for actuation by said fluid under pressure for effecting actuation of said first clutch means, said second clutch means including means adapted when the same is conditioned for actuation to be actuated by slipping of said first clutch means to maintain said direct drive from said drive shaft to said driven shaft, first fluid pressure responsive brake means associated with one of the elements of said planetary gear mechanism adapted when engaged to brake said one element against rotation to effect reverse drive from said drive shaft to said driven shaft, means for admitting fluid under pressure to said first brake means to engage the latter, normally inoperative second brake means associated with said one element of said planetary gear mechanism and first brake means including means for conditioning said second brake means for actuation by said fluid under pressure for effecting actuation of said first brake means, and said second brake means including means adapted when the same is conditioned for actuation to be actuated by slipping of said first brake means to maintain said reverse drive from said drive shaft to said driven shaft.

21. The transmission of claim 20 characterized by said first clutch means being associated with the planet pinion means and the ring gear, the second clutch means being associated with the sun gear and the ring gear, and the first and second brake means being associated with the planet pinion means.

HARRY R. GREENLEE.

REFERENCES CITED

The following references are of record in the file of this patent:

UNITED STATES PATENTS

| Number | Name | Date |
| --- | --- | --- |
| 1,612,770 | Opitz | Dec. 28, 1926 |
| 1,902,701 | Hegemann | Mar. 21, 1933 |
| 2,055,895 | Fawcett | Sept. 29, 1936 |
| 2,141,209 | Emrick | Dec. 27, 1938 |
| 2,339,269 | James | Jan. 18, 1944 |
| 2,410,921 | Avila | Nov. 12, 1946 |

FOREIGN PATENTS

| Number | Country | Date |
| --- | --- | --- |
| 6,827 | France | Mar. 20, 1907 |
| 823,798 | France | Oct. 25, 1937 |